July 7, 1953 D. ABRAHAMSEN 2,644,349
AUTOMATIC SCREW MACHINERY
Filed April 26, 1952 3 Sheets-Sheet 1
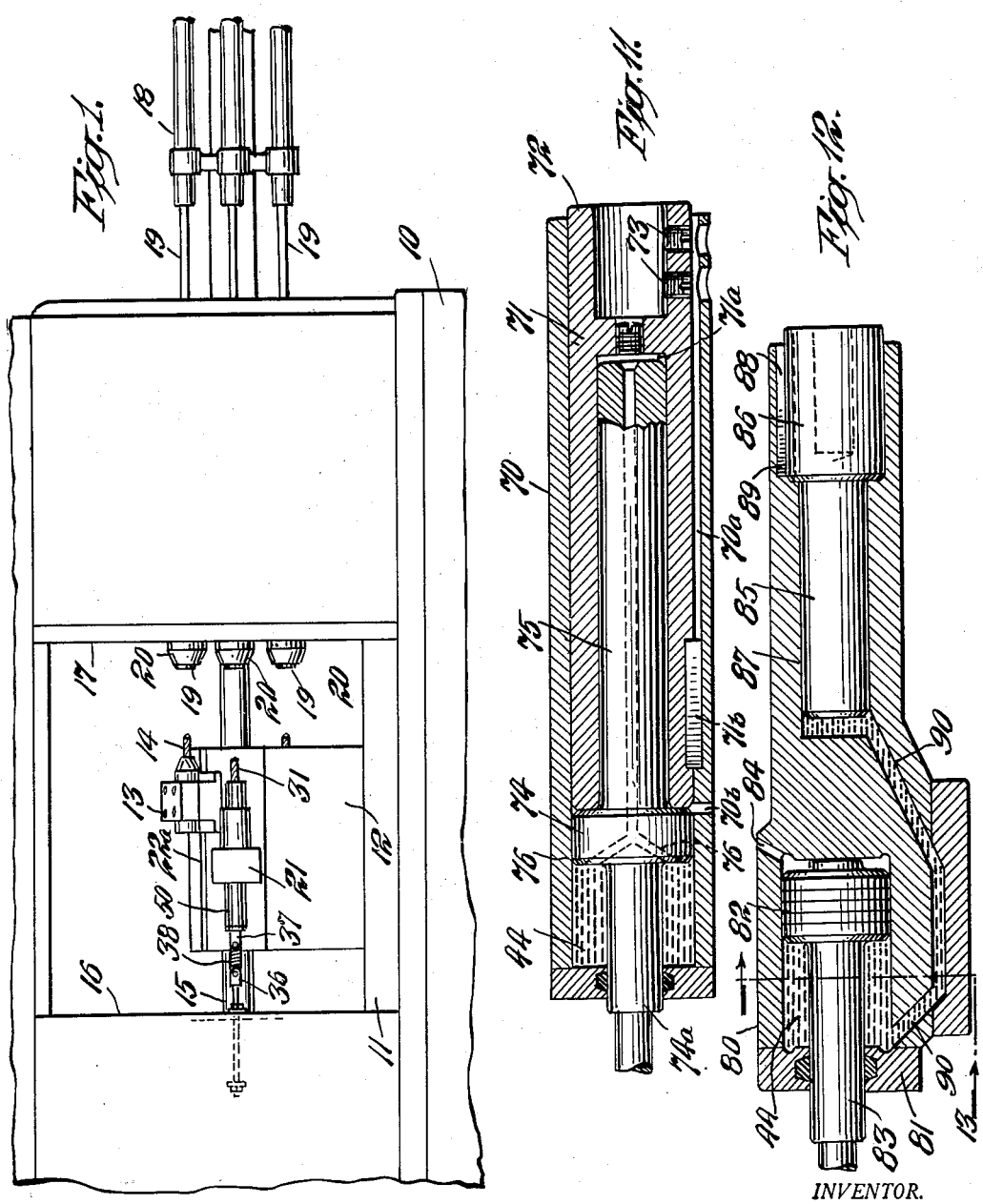
INVENTOR.
DONALD ABRAHAMSEN
ATTORNEY

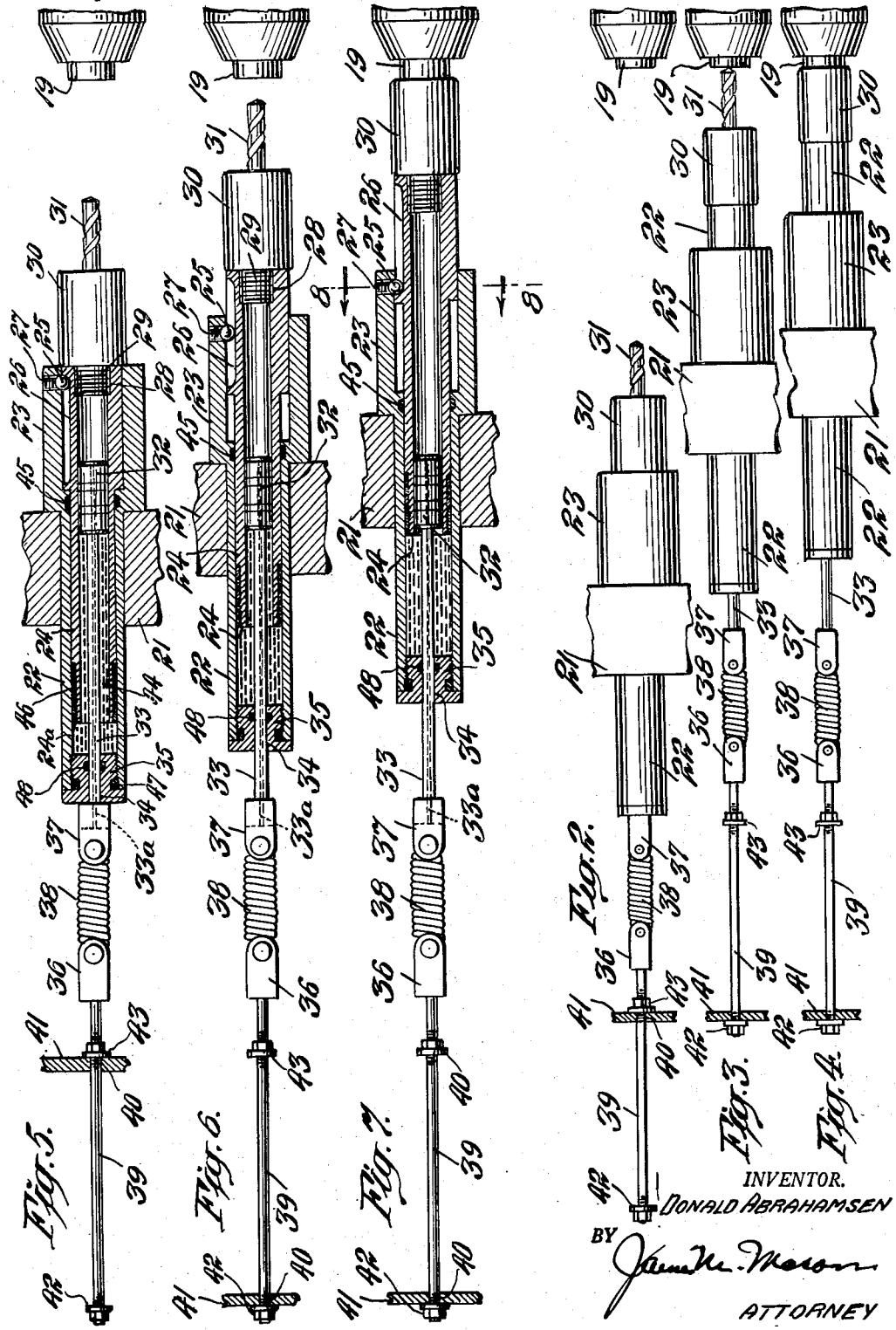

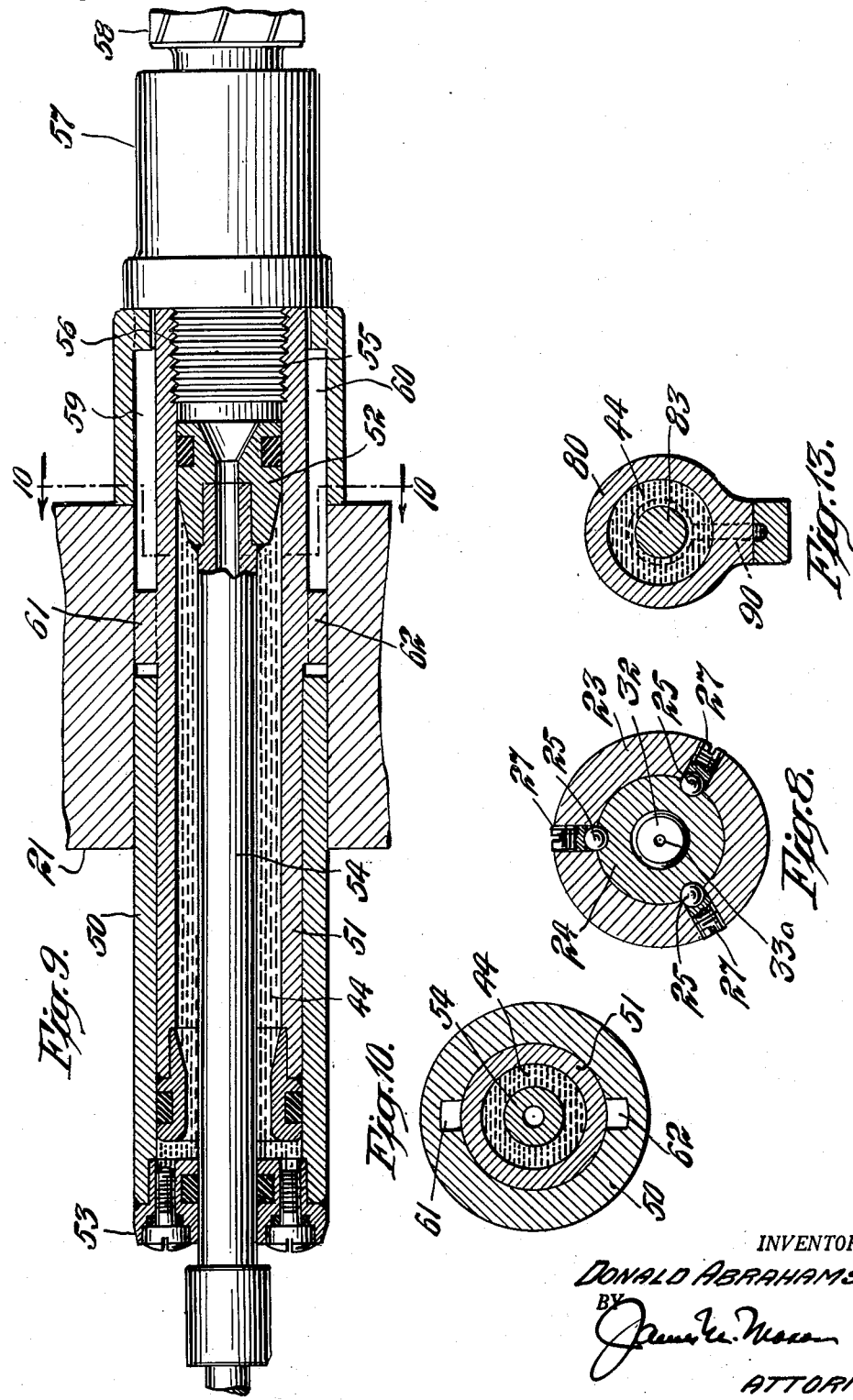

Patented July 7, 1953

2,644,349

UNITED STATES PATENT OFFICE 2,644,349

AUTOMATIC SCREW MACHINERY

Donald Abrahamsen, Harrington Park, N. J.

Application April 26, 1952, Serial No. 284,600

5 Claims. (Cl. 77—33.5)

This invention relates in general to improvements in automatic screw machine tooling and has as a particular object the provision of an arrangement for accelerating the passage of the work through the machine while subjected to various side and end cutting operations. Machines of the foregoing character include a plurality of rotatable work carrying spindles disposed circumferentially in spaced relation about a spindle carrier, the bars of raw stock being fed endwise through each of the spindles and subjected to various lateral and frontal cutting operations. The arrangement is such that the end cutting tools stationarily mounted on the main tool slide automatically move into the rotating spindles in such a manner that different cutting operations are performed by each of the cutting tools on the work carried by each of the spindles. For example, it is customary to provide six of the rotating spindles and the spindle carrier indexes in a circular direction to consecutively bring the work carried by a particular spindle into position to have the particular cutting operation performed, then moving to the next cutting operation and is finally cut off from the stock bar at the end of the sequence of operations. Various functions performed by the end cutting tools mounted upon the main tool slide include drilling, threading, tapping, reaming, facing and similar operations while the work is simultaneously subjected to cross slide manipulations such as knurling, form turning or the like.

In cases where the sequence of main tool slide operations include a relatively deep drilling and reaming cut and a facing or burnishing operation of shallow dimensions it is the practice to accomplish the drilling in a plurality of steps and at different stations in the sequence, using tools of progressively greater length. This is necessitated by the fact that since all tools are fixedly mounted and move together with the main tool slide, a single motion sufficient to produce a limited chamfer at one station would not be sufficient to produce simultaneously the desired depth of cut at the succeeding station. This result has made necessary the inclusion of two or three stations for performing the identical drilling operation in order to get the desired depth of cut in the finished part.

In order to avoid the use of a plurality of reamers it has been necessary to use a special reaming attachment, mounted separately from the tool slide to provide a movement equal to the sum of the movements of the plurality of drills. This requires a separate expensive attachment for each size and make of multiple spindle screw machine. Furthermore, the attachment involves a plurality of moving parts which operate independently of the main tool slide and must be mounted and separately adjusted for the particular part being manufactured. Also the attachment must be entirely removed when no reaming step is required.

According to the present invention the objectionable features inherent in the use of the conventional reaming attachment for the performance of a single reaming operation are eliminated and the throughput of material in the machine greatly increased by the provision of a novel arrangement, the essential embodiments of which are shown in the accompanying drawings for illustrative purposes only.

Figure 1 is an elevational detail of an automatic screw machine showing particularly the relation between the end cutting tools and main tool slide to the spindles.

Figure 2 shows a specific type of accelerated reamer embodying the concepts of the present invention, while Figures 3 and 4 are similar views of the improvement in different positions of movement relative to the spindle.

Figures 5, 6 and 7 are similar views of the present improvement partly in vertical section corresponding to the positions shown in Figures 2, 3 and 4.

Figure 8 is a cross-section on the line 8—8 of Figure 7.

Figure 9 is a modified form of device for accomplishing the purpose of the invention.

Figure 10 is a cross-section on the line 10—10 of Figure 9.

Figures 11 and 12 show still further modified embodiments of the invention.

Figure 13 is a section on the line 13—13 of Figure 12.

Referring to the drawings and in particular to Figure 1, the base 10 of a conventional type automatic screw machine is shown which is surmounted by a track 11 for the reciprocating main tool slide 12 upon which are mounted a plurality of tool holders 13 for various usually different forms of cutting tools 14. The main tool slide 12 is further supported and guided in its reciprocating movement by a rail 15 which extends between the frame 16 and the housing 17 for the spindle carrier and passes through an opening or bearing formed in the main tool slide 12.

It will be observed that a reel 18 is provided to the rear of the spindle housing 17 for rod stock 19 which is fed through the spindle housing 17 to the plurality of spindles to rotatably present the raw stock to the cutting tools 14 mounted upon the main tool slide 12.

In accordance with the present invention I provide means for advancing the movement of the reaming tool in advance of the movement of the main tool slide 12 in its entirety, and this is accomplished by the provision of a tool holder 21 identical to the tool holders 13, which may be removably mounted in one of the tool holding slots 22a of the main tool slide 12 and through an opening in the tool holder 21 a cylinder 22 is fixed having an enlarged portion 23 at the forward end, as shown in Figures 2 to 7 inclusive. Within the cylinder 22 is reciprocably mounted a sleeve 24 having a piston 24a. The sleeve 24 is designed to have limited forward movement within the cylinder 22 and is held against rotative movement relative thereto by means of ball keys 25 held for sliding movement relative to an elongated slot 26 near the front end of the sleeve by lock nuts 27. The front end of the sleeve 24 is internally threaded at 28 for the externally threaded shank 29 of the tool head 30 for the non-rotative reaming tools 31. Slidably mounted within sleeve 24 is a piston 32 having an apertured piston rod 33 which extends through a central opening 34 of a threaded cap 35 which closes the opposite end of the cylinder 22.

The piston rod 33 is provided with a central aperture 33a which vents to the atmosphere the space above piston 32. The piston rod 33 is connected through brackets 36 and 37 and a coil spring 38 to a sliding stop rod 39 which operates through an opening 40 in a portion of the frame 41 of the automatic screw machine.

Forward movement of the stop rod 39, brackets 36, 37, spring 38, piston rod 33 and piston 32 is checked by stop nut 42, whereas rearward movement of these parts, including the piston 32 to the rest position is checked by stop nut 43.

The cylinder 22 is intended to be filled with a relatively incompressible heavy oil 44 between the cap 35 and the bottom of the piston 32. The relatively incompressible oil 44 is localized by the provision of seals 45 at the forward end of the cylinder 22, and 46 at the rear end of the sleeve 24. Further seals 47 and 48 are provided between the cap 35 and the cylinder 22 and the piston rod 33, respectively.

In operation it will be appreciated that with various cutting and forming tools mounted at appropriate positions the forward movement of the main tool slide 12 brings the tools 14 into engagement with the individual pieces of work stock 19 while rotated in the spindles 20. As the tool slide 12 reaches the beginning of its feed stroke further movement of the piston 32, piston rod 33, brackets 36 and 37, spring 38 and stop rod 39 is checked when adjustable stop nut 42 encounters the frame 41 of the machine. The continued forward movement of the tool holder 21 and cylinder 22 and associated parts creates hydraulic pressure on the fluid 44 which is applied on the piston 24a at the base of the sleeve 24, forcing the sleeve 24, the tool head 30 and reamer 31 to move in advance at an accelerated rate relative to the forward motion of the tool holder 21 and cylinder 22. As the main tool slide 12 continues its forward motion the reamer 31 moves into the stock 19 at an accelerated rate with respect to the forward movement of the other cutting and forming tools on the main tool slide, resulting in the completion of the ream in a single operation and at approximately the same time that the cutting operations are completed by the other tools. This eliminates completely the necessity of dividing this reaming cut into two or more steps performed at different stations on the main tool slide as the spindle holder indexes circumferentially. By regulating the adjustable stop nuts 42 and 43 it is possible to accurately control the rate of advance of the tool carrying head 30 with respect to the main tool slide 12 as will be readily apparent.

Figure 9 of the drawings illustrates a further embodiment of the invention described in detail with respect to Figures 2 to 7, wherein a cylinder 50 mounted in tool holder 21 carries a sleeve 51, piston 52 and cap 53 and piston rod 54. As before, the end of the sleeve 51 is internally threaded at 55 for the externally threaded stud 56 of the tool head 57 for the reaming or cutting tool 58. In this embodiment the construction is generally similar to that previously described with the exception that the cylinder 50 is provided at opposite sides with slots 59 and 60 for slidably receiving shoulders 61 and 62 formed on the sleeve 51 to preclude rotation of the sleeve 51 with respect to the cylinder 50 as the tool 58 engages the rotating work piece.

A further modification is shown in Figure 11 wherein the cylinder 70 carries a sleeve 71 having a built-in tool carrying head 72 provided with set screws 73 for securing the tool in the socket. Operating within the cylinder 70 is a piston 74 having a piston rod 74a and an elongated extension 75 of narrower cross-section slidably operable within the sleeve 21. The sleeve 71 is provided with a key 71b which operates within the slot 70a formed in the cylinder 70 to prevent relative rotation between the parts, and an air passage 70b communicates atmospheric pressure between the end of the sleeve 71 and the lower portion of the piston 74. The piston 74 is formed with oil passages 76 connecting the cylinder 70 with the forward cavity 71a of the sleeve 71 in such a manner that as movement of the piston rod 74a is restricted, continued forward motion of the cylinder 70 causes communication of the relatively incompressible fluid through the oil passages 76 to the cavity 71a of the sleeve 71, moving the sleeve 71 and associated tool head 72 forward at an accelerated rate with respect to the cylinder 70. The effect produced by this motion is substantially the same as that described above with respect to the other embodiments of the invention, whereby a deeper cut of the cutting tool is achieved relative to that being accomplished by the other tools on the main tool slide.

A further embodiment shown in Figure 12 includes a cylinder 80, the end of which is closed by a cap 81 and within which operates a piston 82 having a piston rod 83 and being provided with a vent passage 84 communicating the area above the piston 82 with the atmosphere. A secondary piston 85 carrying a tool head 86 is mounted in a supplemental cylinder 87 in advance of the cylinder 80. The rotation of the piston 85 relative to the cylinder 87 is prevented by the provision of a key 88 operating within a slot 89 formed in the cylinder 87. A passage 90 provides for the communication of the relatively incompressible fluid 44 from the cylinder 80 to the rear portion of the cylinder 87 and it will be appreciated that as the forward movement of the piston 82 is checked by piston rod 83, fluid through the passage 90 applies force on the piston imparting an accelerated forward motion to the tool carrying head 86, as will be readily appreciated.

The invention is applicable in general to multiple spindle work rotating machines requiring an accelerated motion of one or more tool carrying heads in conjunction with a main tool slide.

I claim:

1. An automatic screw machine comprising in combination a holder for a plurality of rotatable work carrying spindles, a main tool slide for carrying a plurality of relatively fixed tools movable relative to the rotatable work carrying spindles, a tool carrying head having a piston associated therewith, a cylinder fixed relative to the main tool slide for operably receiving the piston, a second cylinder and a piston including a piston rod movable in the second cylinder, a hydraulic relatively incompressible fluid between the first piston and one side of the second piston, the other side of the second piston being communicated with the atmosphere, and means associated with the piston rod for engagement with an element of the machine to restrict movement of the second piston, whereby hydraulic pressure of the fluid applied from the second piston to the first piston imparts an accelerated forward motion to the tool carrying head.

2. An automatic screw machine comprising in combination a holder for a plurality of rotatable work carrying spindles, a main tool slide for carrying a plurality of relatively fixed tools movable relative to the rotatable work carrying spindles, a hydraulically operated tool carrying head slidably mounted on the main tool slide for advance movement toward the rotatable spindles relative to the tool slide, an elongated element associated with the main tool slide and having an abutment and movable relative to the frame of the machine, and hydraulic means mounted on the tool slide and associated with the tool carrying head, said means being operable to advance the tool carrying head relative to the main tool slide upon engagement of said abutment with the frame of the machine.

3. An automatic screw machine comprising in combination a holder for a plurality of rotatable work carrying spindles, a main tool slide for carrying a plurality of relatively fixed tools movable relative to the rotatable work carrying spindles, a cylinder fixedly mounted on the main tool slide, a sleeve reciprocably mounted within the cylinder, and the forward end of the sleeve having a tool carrying head mounted thereon, and the rear of the sleeve being formed into a first piston, a second piston reciprocably mounted within the sleeve having a piston rod movable relative to the frame of the machine, an abutment on the piston rod, the area within the sleeve above the second piston being vented to the atmosphere, and a hydraulic medium within said sleeve between the lower portion of the second piston and above the effective end of the first piston, whereby movement of the tool slide toward the spindles imparts an accelerated movement of the tool carrying head relative to the main tool slide when the abutment on the piston rod engages the frame of the machine.

4. An automatic screw machine comprising in combination a holder for a plurality of rotatable work carrying spindles, a main tool slide for carrying a plurality of relatively fixed tools movable with respect to the rotatable work carrying spindles, a tool carrying head having a piston associated therewith, a cylinder fixed relative to the main tool slide for slidably receiving the piston, a hydraulic medium within the cylinder, and means operative upon movement of the main tool slide toward the work carrying spindles for the application of hydraulic pressure to the piston to impart an accelerated movement of the tool carrying head relative to the tool slide.

5. An automatic screw machine comprising in combination a holder for a plurality of rotatable work carrying spindles, a main tool slide for carrying a plurality of relatively fixed tools movable with respect to the rotatable work carrying spindles, a tool carrying head having a piston associated therewith, a cylinder fixed relative to the main tool slide for slidably receiving the piston, a second cylinder and a second piston movable therein, a hydraulically relatively incompressible fluid between the first piston and one side of the second piston, the other side of the second piston being communicated with the atmosphere, and means connected with the second piston operative upon movement of the main tool slide toward the work carrying spindles for moving the second piston against the hydraulic fluid thereby imparting hydraulic pressure to the first piston to impart an accelerated forward motion of the tool carrying head with respect to the tool slide.

DONALD ABRAHAMSEN.

References Cited in the file of this patent

UNITED STATES PATENTS

| Number | Name | Date |
|---|---|---|
| 1,522,124 | Hoisington | Jan. 6, 1925 |
| 2,525,805 | Kirkpatrick | Oct. 17, 1950 |